(12) United States Patent
Kopeć et al.

(10) Patent No.: US 12,487,839 B2
(45) Date of Patent: Dec. 2, 2025

(54) METHOD TO IMPROVE PERCEPTION OF PROGRESS WITH A PROGRESS INDICATOR

(71) Applicant: INTERNATIONAL BUSINESS MACHINES CORPORATION, Armonk, NY (US)

(72) Inventors: Radosław Kopeć, Jerzmanowice (PL); Tymoteusz Gedliczka, Cracow (PL); Mark James Lawrence, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 18/503,288

(22) Filed: Nov. 7, 2023

(65) Prior Publication Data

US 2025/0068439 A1 Feb. 27, 2025

(30) Foreign Application Priority Data

Aug. 22, 2023 (GB) ..................................... 2312787

(51) Int. Cl.
*G06F 9/451* (2018.01)
*H04L 67/50* (2022.01)
(52) U.S. Cl.
CPC ............ *G06F 9/451* (2018.02); *H04L 67/535* (2022.05)
(58) Field of Classification Search
CPC ...... G06F 9/451; G06F 11/328; G06F 3/0481; G06F 11/3041; G06F 11/3438; H04L 67/535; G06Q 10/063114
See application file for complete search history.

(56) References Cited

U.S. PATENT DOCUMENTS 10,397,639 B1 * 8/2019 Morris ................ G06F 3/04842
10,772,551 B2 9/2020 Deluca et al.
(Continued)

FOREIGN PATENT DOCUMENTS

CN 102790961 A * 11/2012
CN 103472912 B 3/2018
(Continued)

OTHER PUBLICATIONS

Harrison et al., "Faster Progress Bars: Manipulating Perceived Duration with Visual Augmentations," CHI 2010: Pixels and Perception, Apr. 10-15, 2010, Atlanta, GA, USA, 4 pages.
Kopeć et al., "Method to Improve Perception of Progress With a Progress Indicator," Application No. GB2312787.1, filed Aug. 22, 2023.
(Continued)

*Primary Examiner* — Daniel W Parcher
(74) *Attorney, Agent, or Firm* — Jeffrey Ingalls

(57) ABSTRACT

A method includes determining a state of the user that is any one of an attention state and an attention absence state. If the user is in the attention absence state, the indication by the progress indicator is modified to indicate a first fake progress of the execution of the task slower than the current real task progress. If the state of the user is the attention state for a time period longer than a transition time period after a last transition of the state of the user from the attention absence state back to the attention state, a current progress of the execution of the task is indicated by the progress indicator, otherwise the indication by the progress indicator during the transition time period is modified to indicate a second fake progress of the execution of the task faster than the current real task progress.

20 Claims, 3 Drawing Sheets

(56) References Cited

U.S. PATENT DOCUMENTS

| | | | | |
|---|---|---|---|---|
| 2006/0101293 | A1* | 5/2006 | Chandley | G06F 1/3203 |
| | | | | 713/300 |
| 2008/0059904 | A1* | 3/2008 | Abbey | G06F 3/0481 |
| | | | | 715/767 |
| 2009/0070699 | A1 | 3/2009 | Birkill et al. | |
| 2015/0352444 | A1* | 12/2015 | Smith | A63F 13/537 |
| | | | | 463/31 |
| 2018/0325441 | A1 | 11/2018 | Deluca et al. | |
| 2019/0026212 | A1* | 1/2019 | Verkasalo | H04L 67/535 |
| 2023/0131669 | A1* | 4/2023 | Li | G09G 5/10 |
| | | | | 345/102 |

FOREIGN PATENT DOCUMENTS

| | | | | |
|---|---|---|---|---|
| CN | 110308558 A | * | 10/2019 | G02B 27/0176 |
| JP | 6150930 B2 | | 6/2017 | |
| WO | 2014192001 A2 | | 12/2014 | |

OTHER PUBLICATIONS

"Prioritize Delivery of Content and Services Based on the Attentiveness of the Consumer," IP.Com, 2014, IPCOM00023652D, 6 pages.

Kurusathianpong et al., "Comparison of Perceived Waiting Time Between Two Lengths of Progress Indicator and Two Styles of Graphics Animation With Perceived Uncertainty as a Covariate," 2018 Seventh ICT International Student Project Conference (ICT-ISPC), 2018, 6 pages.

* cited by examiner

METHOD TO IMPROVE PERCEPTION OF PROGRESS WITH A PROGRESS INDICATOR

BACKGROUND

The present disclosure relates to the field of digital computer systems, and more specifically, for controlling the operation of a user system.

A progress indicator may be a graphical representation on a display device that provides feedback to the user about how much of the ongoing task is accomplished, and to indicate the approximate completion or remaining time of the task. In some time-consuming operations, it may difficult for the user to perceive the progress of the operation because the progress is often imperceptible. The absence of a sense of progress may lead users to doubt the progress of a long process, causing frustration, confusion, and potentially leading to premature abandonment of the task.

SUMMARY

Various embodiments provide a method for controlling operation of a user system as described by the subject matter of the independent claims. Embodiments are described in the dependent claims. Embodiments may be freely combined with each other if they are not mutually exclusive.

In embodiments, a method for controlling the operation of a system executing a task is provided. The system comprises a display device of a user system, and a progress indicator indicating a level of an accomplishment over time of the task. The method comprises repeatedly: determining a state of a user of the display device, the state of the user being any one of an attention state and an attention absence state, the attention absence state corresponding to a lack of attention of the user to the display device and the attention state corresponding to an attention of the user to the display device, in case the user is in the attention absence state, modify of the indication by the progress indicator to indicate a first fake progress of the execution of the task, the first fake progress being slower than the current real progress of the execution of the task; in case the state of the user is the attention state for a time period longer than a transition time period after a last transition of the state of the user from the attention absence state back to the attention state, indicating by the progress indicator a current progress of the execution of the task, otherwise modifying during the transition time period the progress indicator to indicate a second fake progress of the execution of the task faster than the current real task progress until the second fake progress corresponds to the current real task progress, the transition time period corresponding to the time required after the last transition of the state of the user from the attention absence state back to the attention state until the second fake progress is corresponding to the current real task progress. In one example, the task may be at least partially controlled by the user. Alternatively, the task may be automatically controlled.

In embodiments, a computer program for controlling operation of a system executing a task is provided. The system comprises a display device of a user system, and a progress indicator indicating a level of an accomplishment over time of the task. The computer program is configured for: determining a state of a user of the display device, the state of the user being any one of an attention state and an attention absence state, the attention absence state corresponding to a lack of attention of the user to the display device and the attention state corresponding to an attention of the user to the display device, in case the user is in the attention absence state, modify of the indication by the progress indicator to indicate a first fake progress of the execution of the task, the first fake progress being slower than the current real progress of the execution of the task; in case the state of the user is the attention state for a time period longer than a transition time period after a last transition of the state of the user from the attention absence state back to the attention state, indicating by the progress indicator a current progress of the execution of the task, otherwise modifying during the transition time period the progress indicator to indicate a second fake progress of the execution of the task faster than the current real task progress until the second fake progress corresponds to the current real task progress, the transition time period corresponding to the time required after the last transition of the state of the user from the attention absence state back to the attention state until the second fake progress is corresponding to the current real task progress.

In embodiments, a computer system for controlling operation of a system executing task is provided. The system comprises a display device of a user system, and a progress indicator indicating a level of an accomplishment over time of the task. The computer system is configured for: determining a state of a user of the display device, the state of the user being any one of an attention state and an attention absence state, the attention absence state corresponding to a lack of attention of the user to the display device and the attention state corresponding to an attention of the user to the display device, in case the user is in the attention absence state, modify of the indication by the progress indicator to indicate a first fake progress of the execution of the task, the first fake progress being slower than the current real progress of the execution of the task; in case the state of the user is the attention state for a time period longer than a transition time period after a last transition of the state of the user from the attention absence state back to the attention state, indicating by the progress indicator a current progress of the execution of the task, otherwise modifying during the transition time period the progress indicator to indicate a second fake progress of the execution of the task faster than the current real task progress until the second fake progress corresponds to the current real task progress, the transition time period corresponding to the time required after the last transition of the state of the user from the attention absence state back to the attention state until the second fake progress is corresponding to the current real task progress.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Figure 1:
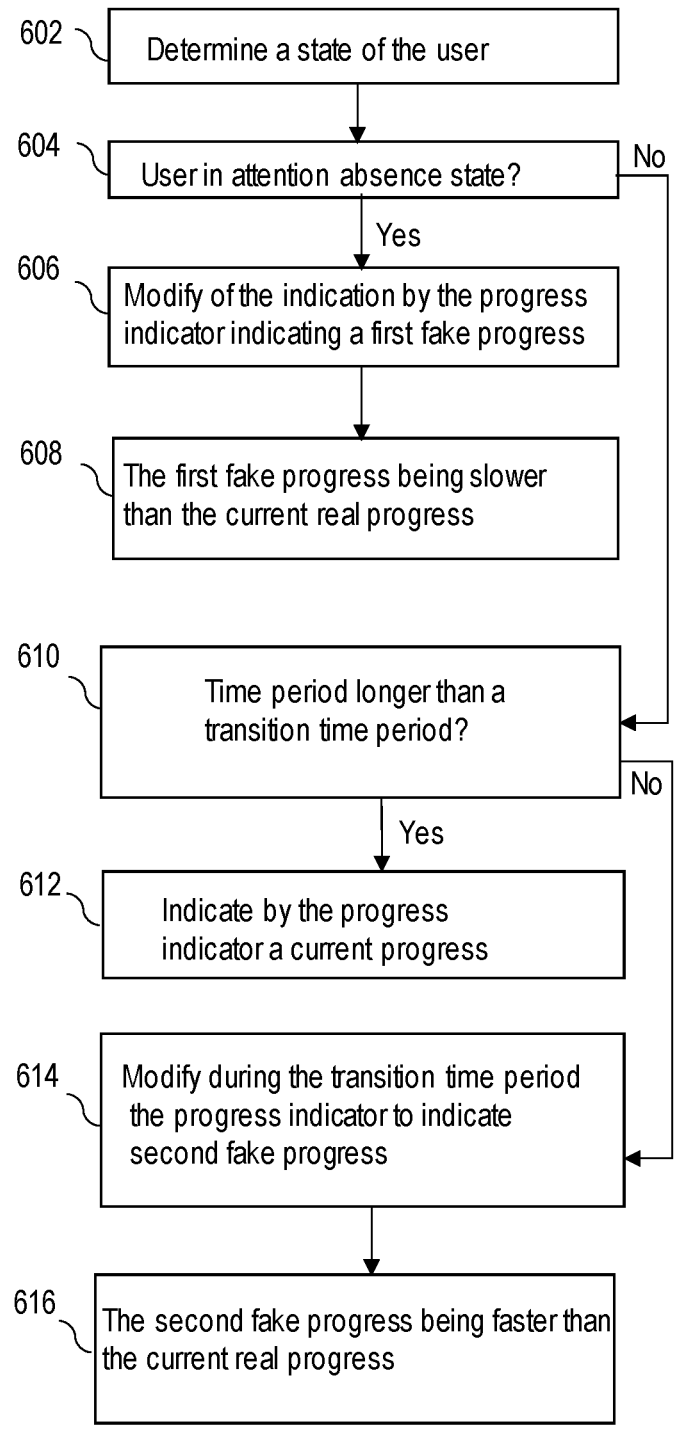
FIG. 1 is a flow chart of a controlling operation of a system in accordance with an embodiment.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A progress indicator may be understood as a graphical representation on a display device that provides feedback to the user about how much of an ongoing task is accomplished, or to indicate the approximate completion or remaining time of the task for completion. A progress indicator typically comprises a bar, line, or animation that fills up, advances, or changes as the task progresses. It may also consist of textual information, such as a percentage, time estimation, or descriptive messages. Progress indicators are commonly used where tasks or operations involve significant processing time, e.g., software applications, websites, and other interfaces. They improve the user experience by providing a sense of progress indicated by level of accomplishment, managing expectations, and reducing user frustration during waiting periods.

A fake progress indicating a fake level of accomplishment of the task is indicated by the progress indicator, modifying the actual rate of progress. In case the user is in the attention absence state, the current progress is modified as indicated by the progress indicator to a first fake progress of the execution of the task, the first fake progress being slower than the current real progress of the execution of the task. A second fake progress is indicated by the progress indicator in case the user is back in the attention state within a time period after the last transition of the state of the user from the attention absence state back to the attention state. The second fake progress of the execution of the task is faster than the current real task progress until the second fake progress corresponds to the current real task progress. In one example, the task may be at least partially controlled by the user. Alternatively, the task may be automatically controlled e.g., the system may fully control the task, for example, such as the task of operating system update. This may be advantageous as the user may not interact with the progress indicator.

A fake progress may build user trust in the application or system, leading to a more favorable perception of its reliability and performance. A fake progress may enhance user engagement. If users see progress whenever they are back to attention state, it can give them a sense of progression and achievement, which could encourage them to interact more frequently with the application. A fake progress may create a perceived performance. Sometimes, the perception of speed or progress can be more important than the actual speed itself. For example, if a user comes back to the application and sees the progress bar quickly catch up, it could give the illusion that the application is performing tasks quickly. In addition, a fake progress may reduce user's anxiety. Seeing a slowly moving progress bar may induce anxiety for some users, especially for longer tasks. By slowing down the progress bar when the user is not paying attention, and speeding it up when they are, the user may perceive the progress as less daunting. A fake progress may significantly improve the user experience in various applications and interfaces.

In one example, the state of the user of the display device of the user system is determined by monitoring at least one of: a mouse interaction with the user system, a keyboard interaction with the user system, a haptic interaction with the display device. By tracking mouse movements, clicks, click duration, and other interactions, it may be possible to gather information that determines the user's engagement, attention, and overall system usage. Continuous and frequent mouse movements may suggest a user's attention state, while extended periods of inactivity or infrequent mouse interactions might indicate a user's attention absence state. Keyboard monitoring involves tracking keystrokes, key combinations, typing speed, and other key-board related activities. Regular and consistent keyboard input may suggest a user's active involvement and interaction with the display device, while extended periods of inactivity might indicate a user's reduced engagement or user's attention absence state with the user's system.

By tracking specific keystrokes or combinations, it becomes possible for the user system to identify user-initiated actions, such as opening applications, executing commands, or navigating through menus. These actions are traced and programmed in the user's system indicating user's attention state. A haptic interaction with the display device may involve the sense of touch and tactile feedback provided by devices such as touchscreens, force-sensitive interfaces, or haptic feedback systems. Tracking touch events, such as taps, swipes, or gestures, may indicate the user's attention state. Haptic interaction may also provide force or pressure feedback to the user system by monitoring the intensity or duration of applied pressure or force which may reveal user intent, such as soft touch for navigation or stronger pressure for actions like zooming or manipulating objects indicating the user's attention state with the display device.

Monitoring mouse, keyboard, or haptic interactions with the user system may reliably provide information to the user system regarding the state of the user without requiring any additional hardware.

In an example, the progress indicator is displayed on the display device of the user system, wherein in case the state of the user is the attention state, the method further comprises: determining a visibility of the progress indicator using the display device, the visibility indicating that the progress indicator is displayed and visible to the user on the display device, wherein in case the progress indicator is visible confirming that the user is in the attention state, otherwise, determining that the user is in the attention absence state.

In one example, the visibility of the progress indicator may suggest that the user is potentially monitoring the progress or awaiting completion of the task. When the user's attention is directed towards monitoring the progress, the user is considered being in attention state. The user's level of attention may thus be inferred based on their apparent visual fixation of the progress indicator. For example, in case a progress indicator, indicating certain level of task accomplishment, is obscured by another window in a browser or application, then the user is considered being in attention absence state.

In one example, the progress indicator visibility is determined by taking screen shots of windows displayed on the display device, and using the screen shots to determine whether the progress indicator is visible. By analyzing a series of screenshots captured over time, it is possible to track the visibility of the progress indicator displayed on the display device. This may help understand how frequently the progress indicator is visible or if it remains consistently present during specific tasks or processes.

In one example, the state of the user is determined using a face recognition with a camera of the user system, wherein in case the user system recognizes a face, it is determined that the user is in the attention state, otherwise, it is determined that the user is in attention absence state. A facial recognition technology by using a camera of the user system may detect and analyze certain facial cues and expressions that are indicative of the user's attention state. Face recognition may analyze facial expressions, e.g., raised eyebrows, squinting, or furrowing of the brow, which may indicate user's attention state. Similarly, through facial recognition, eye gaze tracking may be performed to determine the direction of the user's gaze. For example, if the user's gaze is directed towards the display device or other specific areas of interest, the face recognition indicates the user's attention state by determining that their attention is engaged in that particular direction. Also, the face recognition may provide information of the user's attention state and proximity to the system by tracking the user's head orientation and alignment with the display device, which may be an indirect indication of the user's attention state.

In one example, the attention state of the user is determined in response to the user clicking on buttons integrated in the user system, the buttons enabling a user interaction with the display device of the user system. Clicking buttons integrated in the user system are deliberate actions initiated by the user, suggesting their attention state. Users tend to click buttons that are relevant to their current task or goal, indicating their attention to the associated functionality or action. The act of clicking involves visually identifying and targeting the button by the user, which suggests that the user's attention is focused on the area of the display device containing the button. A button may be displayed on a display device next to the progress indicator. Some examples include cancel button, save button, close button, submit button, or play/pause button. Also, in an alternative implementation the button may be integrated in various hardware devices and objects. They provide a simple and intuitive way for users to interact with the device and perform certain tasks. Some examples include a mouse button, volume button, or any dedicated computer keyboard button.

In one example, the state of the user is determined by using a built-in microphone of the user system to detect a sound and using a trained artificial intelligence (AI) algorithm in order to determine whether the sound is a sound caused by the user, wherein in case the sound is caused by the user, it is determined that the user is in the attention state, otherwise, it is determined that the user is in the attention absence state. Sound activities such as speaking, humming, or making sounds, suggest a user's attention state. By using a trained AI algorithm, specific audio cues created by the user can be detected which indicates the user's state of attention. For example, the trained AI model may be configured to receive as input the sound and to output a prediction of the state of the user. A training is done by feeding as input different user sounds, and as output different associated user states. This example may be advantageous because it may enable an accurate prediction of the sound activities which may in turn enable an improved determination of the state of the user. The artificial intelligence model may, for example, be a deep neural network or another AI model that can be trained to predict the state of the user by using the user's usage profile.

In one example, the user's eye movement is tracked to determine whether they are focused on the progress indicator. In case the eyes are focused on the progress indicator, it is determined that the user is in the attention state, otherwise, it is determined that the user is in the attention absence state. If the eye tracking reveals that the user's gaze is focused on the progress indicator, it may suggest that the user's attention is actively focused on monitoring the progress of the task associated with the indicator. Eye tracking may identify instances where the user's attention may have been diverted from the progress indicator. If the user's gaze deviates from the progress indicator or if the eye movements are away from the progress indicator, it may indicate user's attention absence state.

In one example, upon detecting the user attention state, information may be provided by the progress indicator indicating the portion of accomplishment of the task displayed in the display device during the user's attention absence state. The actual level of accomplishment may be provided to the user by the user system in any aspect of the information, e.g., visual representation, audio cues or textual representation. Upon the user's regained attention state, the user realizes the indication by the progress indicator indicating the portion of accomplishment which may redirect the attention back to the actual state of the task. This restoration of attention may manifest as a renewed focus, increased scrutiny of the progress indicator, or a shift in behavior, such as adjusting their expectations or reassessing their interaction with the user system.

In one example, the first fake progress is determined by reducing by a predefined amount the current progress value per time unit. The predefined amount may be any numerical factor reducing the actual progress value per unit time. The reduction of the actual progress value may, for example, be determined by a predefined linear or non-linear function acting on the actual progress value made during the user's attention absence state. The displayed first fake progress may be expressed as a sum of the actual progress value until the transition of the user state from the attention state to attention absence state together with the reduced amount of the actual progress made during user's attention absence state. The second fake progress may be determined by increasing by a predefined amount the currently indicated progress value per time unit. The predefined amount may be any numerical factor increasing the actual progress value per unit time. The increment of the actual progress value may be determined by a time variable multiplied with the actual progress made during user attention absence state. The time variable may be the ratio of the transition time period to the configurable constant (measured in time units) representing the time that is used to catch up with the displayed progress. The displayed second fake progress is expressed as a sum of the displayed first fake progress value detected upon the transition time period of the user together with the increased portion of the actual progress made during user's attention absence state. However, other ways of "catching up" from the first fake progress indicated to the real actual progress upon detecting the user attention state may be performed according to other logics. For example, an exponential function may be employed which is configured to more quickly catch up with the real actual progress on the beginning of the second fake progress, while said "catching up" flattens a bit at the end of the transition time period.

In one example, in case an ending event occurs, then the user system may be either removing the progress indicator or informing the user that the task has been finished. Depending upon the user system program, the progress indicator may either be removed at the instant of the accomplishment of the task, or the user system may inform the user that the task has been finished by indicating the full level of accomplishment of the task in the progress indicator in any aspect of information, e.g., visual representation, audio cues or textual representation. In another example, the ending event includes any one of: the task has finished during the user attention absence state, a failure at any point during the running of the task, an error at any point during the running of the task, a warning at any point during the running of the task, or a prompt at any point during the running of the task.

In one example, during the user's attention absence state, the progress indicator is displayed with an attention absence state color until the user's attention is detected, the displaying further comprising displaying the progress with a different attention state color. Displaying different colors in a progress indicator depending on the user's state can provide insightful information. The change in color in the progress indicator indicates a shift in the user's state. Using different colors for different user states provides visual feedback to the user, alerting the users to their attention without explicitly informing them of the causes. The change in the color may help users quickly recognize and assesses their level of attention, allowing them to self-regulate and refocus their attention on the task. Using different colors in the progress indicator for different user state may also prompt users to be more conscious of their attention state.

In one example, the task may comprise multiple task steps, wherein the progress indicator may indicate the number of completed task steps over time. The progress indicator that tracks the completion of multiple task steps over time may be represented either in visual representation or in numerical representation. In case of visual representation, different figures may be used such as progress bar, pie chart, or timeline. In each of the above-mentioned figures, the figures are divided into sections, segments, or checkpoints, wherein as the user completes each step, the corresponding section of the progress bar fills up with color or changes appearance. In case of numerical representation, a numeric value that indicates the overall progress of the task, calculated by dividing the completed task steps by the total number of steps and multiplying by factor hundred.

FIG. 1 is a flow chart of a controlling operation of a system in accordance with an example of the present subject matter. In the following, it is assumed that the progress is depicted on a graphical user interface (GUI) by means of a line. In block 602, the state of the user is determined. The state of the user is determined to be either attention state or attention absence state as mentioned in the determination criterion in block 604. In block 606, in case the user is in attention absence state, a modification of the indication by the progress indicator is made indicating a first fake progress. In block 608, the first fake progress is displayed, wherein the first fake progress is slower than the current real progress.

In case the state of the user is in the attention state, block 610 provides a criterion of the indication of the progress indicator for a time period longer than a transition time period. In case the state of the user is the attention state for a time period longer than a transition time period after a last transition of the state of the user from the attention absence state back to the attention state, then the real actual progress is displayed in block 612. In block 614, if in case the time period is less than a transition time period, a modification of the indication by the progress indicator is made indicating a second fake progress. In block 616, the second fake progress is displayed, wherein the second fake progress is faster than the current real progress.

In one example, the method depicted in FIG. 1 is performed repeatedly. This means that after block 608, block 612 and block 616 the method loops back to block 602.

Figure 2:
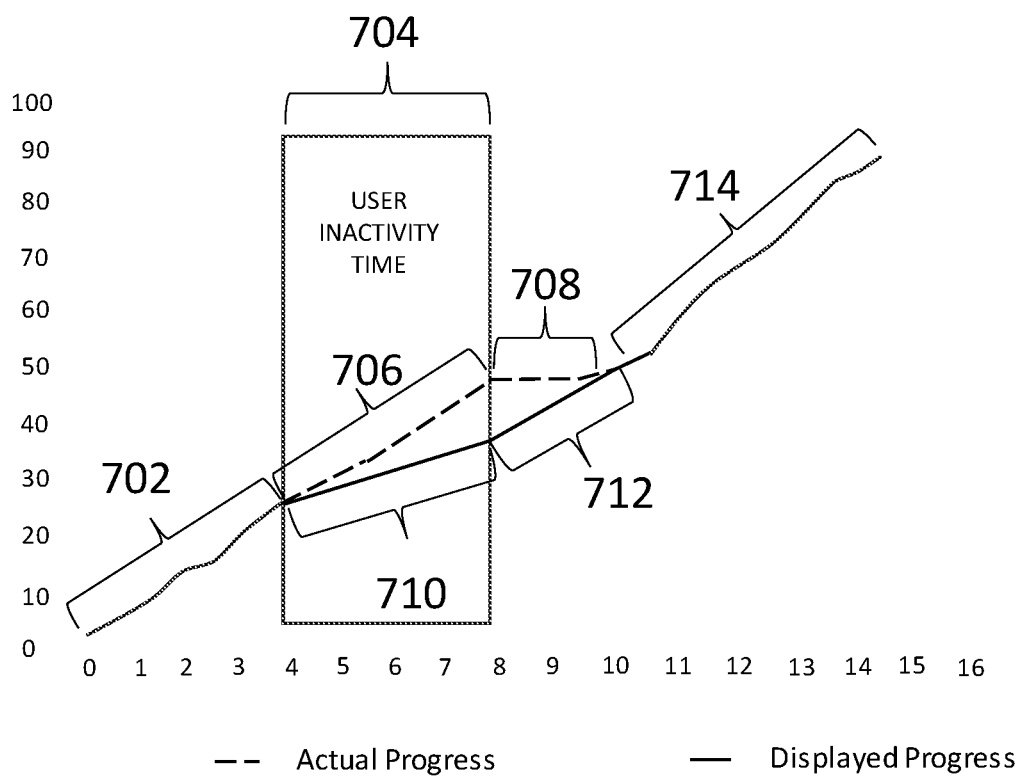
FIG. 2 is a chart illustrating a sample difference between displayed progress and actual progress over time.

FIG. 2 is a chart illustrating a sample difference between a displayed progress and an actual progress over time. Line portion 702 is the current real progress over time. Section 704 is the period of time during which the user is in the attention absence state (e.g., user inactive time). Line portion 706 is the actual progress made by the progress indicator during the attention absence state. Line portion 710 is the first fake progress indicated by the progress indicator during the attention absence state. Line portion 708 is the is the actual progress made by the progress indicator during the transition time period. Line portion 712 is the second fake progress indicated by the progress indicator during the transition time period, wherein at the end of the transition time period the second fake progress reaches or coincides with the current real task progress. Line portion 714 is the displayed current real progress over time after the user is back to attention state and after the transition time period ends.

Computing environment 800 contains an example of an environment for the execution of at least some of the computer code 900 for controlling operation of a user system involved in performing the methods of the embodiments. In addition to the code 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

Figure 3:
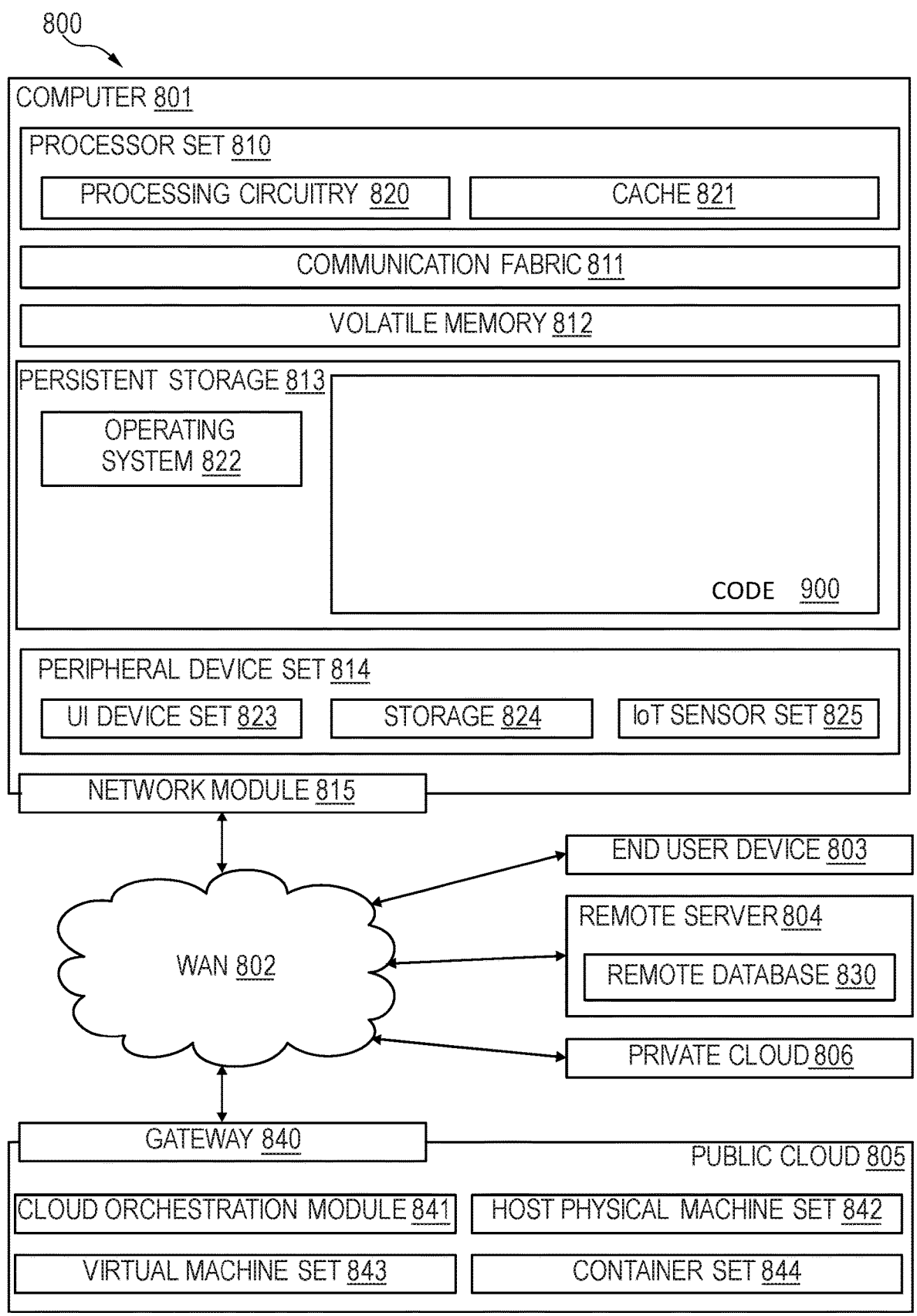
FIG. 3 illustrates a block diagram of a computing environment in accordance with an embodiment.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 3. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the embodiments"). These computer readable program instructions are stored in various types of computer readable storage media, such as cache 821 and the other storage media discussed below. The program instructions, and associated data, are accessed by processor set 810 to control and direct performance of the embodiments. In computing environment 800, at least some of the instructions for performing the inventive methods may be stored in block 900 in persistent storage 813.

Communication fabric 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open source Portable Operating System Interface-type operating systems that employ a kernel. The code 900 typically includes at least some of the computer code involved in performing the embodiments.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling the operation of a system that is executing a task, the method comprising:
   determining, based on information received from an input device or sensor coupled to the system, a change in a state of a user of a display device between an attention state and an attention absence state, the attention absence state corresponding to a lack of attention of the user to the display device and the attention state corresponding to an attention of the user to the display device;
   in response to determining that the state of the user has changed to the attention absence state, modifying the indication of a displayed progress indicator to indicate a first fake progress of the execution of the task, the first fake progress being slower than the current real progress of the execution of the task;
   in response to determining that the state of the user has changed to the attention state for a time period longer than a transition time period after a last transition of the state of the user from the attention absence state back to the attention state, indicating by the progress indicator a current progress of the execution of the task; and
   in response to determining that the state of the user has changed to the attention state for a time period that is not longer than the transition time period, modifying, during the transition time period, the progress indicator to indicate a second fake progress of the execution of the task faster than the current real task progress until the second fake progress corresponds to the current real task progress, the transition time period corresponding to the time required after the last transition of the state of the user from the attention absence state back to the attention state until the second fake progress corresponds to the current real task progress.

2. The method according to the claim 1, wherein the state of the user of the display device of the user system is determined by: monitoring at least one of: a mouse interaction with the user system, a touchpad interaction with the user system, a keyboard interaction with the user system, a haptic interaction with the display device; and comparing the monitored interaction with a respective reference interaction pattern for determining the state.

3. The method according to the claim 2, wherein the progress indicator is displayed in a browser of the user system, and wherein if the state of the user is the attention state, the method further comprises: determining a visibility of the progress indicator using the browser, the visibility indicating that the progress indicator is displayed and visible to the user on the display device; confirming that the user is in the attention state if the progress indicator is visible; and determining that the user is in the attention absence state if the progress indicator is not visible.

4. The method according to the claim 3, wherein the progress indicator visibility is determined by taking screen shots of windows displayed on the display device, and using the screen shots to determine whether the progress indicator is visible.

5. The method according to claim 1, wherein the state of the user is determined using face recognition with a camera of the user system, the method further comprising: determining that the user is in the attention state if the user system recognizes a face; determining that the user is in attention absence state if the user system does not recognize a face.

6. The method according to claim 1, wherein the attention state of the user is determined in response to the user clicking on buttons integrated in the us er system, the buttons enabling a user interaction with the display device of the user system.

7. The method according to claim 1, the method further comprising: determining the state of the user by using a built-in microphone of the user system to detect a sound and using a trained AI algorithm in order to determine whether the sound is a sound caused by the user; determining that the user is in the attention state if the sound is caused by the user; and determining that the user is in the attention absence state if the sound is not caused by the user.

8. The method according to claim 1, the method further comprising: tracking the user's eyes movement to determine whether they are focused on the progress indicator; determining that the user is in the attention state if the eyes are focused on the progress indicator; and determining that the user is in the attention absence state if the eyes are not focused on the progress indicator.

9. The method according to claim 1, the method further comprising upon detecting the user attention state, providing information indicating the portion of accomplishment of the task displayed in the display device during the user's attention absence state.

10. The method according to claim 1, wherein the first fake progress is determined by reducing by a predefined amount the current progress value per time unit; and wherein the second fake progress is determined by increasing the current progress value per time unit by a predefined amount.

11. The method according to claim 1, the method further comprising: upon determining that the task has finished during the user attention absence state, performing at least one action, wherein the at least one action is selected from the group consisting of: closing the progress indicator, or waiting for the user attention state to inform the user that the task has been finished.

12. The method according to claim 1, wherein during the user's attention absence state, the progress indicator is displayed with an attention absence state color until the user's attention is detected, the displaying further comprising displaying the progress with another attention state different color.

13. The method according to claim 1, the task comprising multiple task steps, wherein the progress indicator indicates the number of completed task steps over time.

14. The computer program according to claim 1, wherein the state of the user is determined using face recognition with a camera of the user system, the method further comprising: determining that the user is in the attention state if the user system recognizes a face; determining that the user is in attention absence state if the user system does not recognize a face.

15. The computer program according to claim 1, wherein the attention state of the user is determined in response to the user clicking on buttons integrated in the user system, the buttons enabling a user interaction with the display device of the user system.

16. A computer program product for controlling the operation of a system that is executing a task, the computer program product comprising a computer readable storage medium having program instructions embodied therewith, the program instructions executable by a device to cause the device to:
   determine, based on information received from an input device or sensor coupled to the system, a change in a state of a user of a display device between an attention state and an attention absence state, the attention absence state corresponding to a lack of attention of the user to the display device and the attention state corresponding to an attention of the user to the display device;

in response to determining that the state of the user has changed to the attention absence state, modifying the indication of a displayed progress indicator to indicate a first fake progress of the execution of the task, the first fake progress being lower than the current real progress of the execution of the task;

in response to determining that the state of the user has changed to the attention state for a time period longer than a transition time period after a last transition of the state of the user from the attention absence state back to the attention state, indicating by the progress indicator a current progress of the execution of the task; and in response to determining that the state of the user has changed to the attention state for a time period that is not longer than a transition time period, modifying, during the transition time period, the progress indicator to indicate a second fake progress of the execution of the task faster than the current real task progress until the second fake progress corresponds to the current real task progress, the transition time period corresponding to the time required after the last transition of the state of the user from the attention absence state back to the attention state until the second fake progress is corresponding to the current real task progress.

17. The computer program according to claim 16, wherein the state of the user of the display device of the user system is determined by: monitoring at least one of: a mouse interaction with the user system, a touchpad interaction with the user system, a keyboard interaction with the user system, a haptic interaction with the display device; and comparing the monitored interaction with a respective reference interaction pattern for determining the state.

18. The computer program according to the claim 17, wherein the progress indicator is displayed in a browser of the user system, and wherein upon determining that the state of the user is the attention state, the program instructions further cause the device to: determine a visibility of the progress indicator using the browser, the visibility indicating that the progress indicator is displayed and visible to the user on the display device; confirm that the user is in the attention state if the progress indicator is visible; and determine that the user is in the attention absence state if the process indicator is not visible.

19. The computer program according to claim 18, wherein the progress indicator visibility is determined by taking screen shots of windows displayed on the display device, and using the screen shots to determine whether the progress indicator is visible.

20. A computer system for controlling operation of a system that is executing a task, the computer system comprising: a memory subsystem, with program instructions included thereon; and a processor in communication with the memory subsystem, wherein the program instructions cause the processor to:

determine, based on information received from an input device or sensor coupled to the system, a change in a state of a user of a display device between an attention state and an attention absence state, the attention absence state corresponding to a lack of attention of the user to the display device and the attention state corresponding to an attention of the user to the display device;

in response to determining that the state of the user has changed to the attention absence state, modifying the indication of a displayed progress indicator to indicate a first fake progress of the execution of the task, the first fake progress being lower than the current real progress of the execution of the task;

in response to determining that the state of the user has changed to is the attention state for a time period longer than a transition time period after a last transition of the state of the user from the attention absence state back to the attention state, indicating by the progress indicator a current progress of the execution of the task; and in response to determining that the state of the user has changed to the attention state for a time period that is not longer than a transition time period, modifying, during the transition time period, the progress indicator to indicate a second fake progress of the execution of the task faster than the current real task progress until the second fake progress corresponds to the current real task progress, the transition time period corresponding to the time required after the last transition of the state of the user from the attention absence state back to the attention state until the second fake progress is corresponding to the current real task progress.

\* \* \* \* \*